United States Patent [19]

Chen

[11] Patent Number: 5,373,503
[45] Date of Patent: Dec. 13, 1994

[54] GROUP RANDOMLY ADDRESSED POLLING METHOD

[75] Inventor: Kwang-Cheng Chen, Hsinchu, Taiwan, Prov. of China

[73] Assignee: Information Technology, Inc., Taipei, Taiwan, Prov. of China

[21] Appl. No.: 56,223

[22] Filed: Apr. 30, 1993

[51] Int. Cl.⁵ .................. H04B 7/216; H04B 7/26
[52] U.S. Cl. ............................ 370/18; 370/95.2; 375/1
[58] Field of Search .......... 370/18, 94.1, 94.2, 370/95.1, 95.2, 95.3, 858; 340/825.54, 825.07, 825.08; 375/1; 371/32, 33; 379/60, 63; 455/32.1, 38.1, 53.1, 54.1, 56.1, 54.2

[56] References Cited

U.S. PATENT DOCUMENTS

| | | | |
|---|---|---|---|
| 4,251,865 | 2/1981 | Moore et al. | 370/95.2 |
| 5,046,066 | 9/1991 | Messenger | 370/18 |
| 5,206,881 | 4/1993 | Messenger et al. | 370/18 |

OTHER PUBLICATIONS

An article entitled *On the Design of Medium Access Control Protocol for High Speed Wireless LANs*, by Kwang-Cheng Chen, published by the Department of Electrical Engineering of National Tsing Hua University, Hsinchu, Taiwan.

Primary Examiner—Wellington Chin
Attorney, Agent, or Firm—David I. Roche

[57] ABSTRACT

A randomly addressed polling (RAP) method for wireless networks is proposed to meet the requirements for wireless LANs which remain open to the research community. The RAP method has the following steps: When a base station is ready to conduct an up-link communication, it broadcasts a ready message to all users under its coverage; each user whenever has a packet to transmit generates a random number; all random numbers are simultaneously transmitted to the base station in response to the ready message; base station collects the random numbers, and polls the active users according to the collected random numbers; and when the base station successfully/unsuccessfully receives the packet from the user, it sends a positive/negative acknowledgment to the user.

23 Claims, 8 Drawing Sheets

Throughput, 10 Mobile Nodes, L=2, p=5
Overhead Length= 0.1 (solid), 0.5 (dot), 1.0 (dash)

Delay-Throughput, 10 Mobile Nodes, L=2, p=5
Overhead Length= 0.1 (solid), 0.5 (dot), 1.0 (dash)

Throughput, 10 Mobile Nodes, L=2, p=7
Overhead Length= 0.2 (solid), 1.0 (dot), 2.0 (dash)

Delay-Throughput, 10 Mobile Nodes, L=2, p=7
Overhead Length= 0.2 (solid), 1.0 (dot), 2.0 (dash)

Throughput, 10 Mobile Nodes, p=5, L=1,2,3,4
Overhead Length= 0.05, 0.1, 0.15, 0.2 (dash-dot, solid, dot, dash)

Delay-Throughput, Same Parameters as Figure 7

Throughput, 10 Mobile Nodes, p=5, L=1,2,3,4
Overhead Length= 0.5, 1.0, 1.5, 2.0 (dash-dot, solid, dot, dash)

Delay-Throughput, Same Parameters as Figure 9

GROUP RANDOMLY ADDRESSED POLLING METHOD

BACKGROUND OF THE INVENTION

The present invention relates generally to a medium access control protocol for networks, and more particularly to a group randomly addressed polling method for wireless networks.

Personal communication services and next generation cellular communication are going to the direction of providing multiple cell network structure, even microcells or pico-cells. However, since the spectrum is so valuable that how to efficiently use it and provide seamless services is one of the most important issues in personal wireless communication. Among so many personal communication services, one of the hardest tasks is the wireless local data communication. With the emerging and developing of two technical trends, i.e. the lightweight portable high performance computers and critical demand of information exchange via data networks, the wireless local area network (wireless LAN) attracts great attention in the computer and communication industries. Under the great market demand, IEEE Computer Society has formed a standard studying group IEEE 802.11 Wireless LANs to standardize the high-speed wireless local area networks. The goal of the IEEE 802.11 is to define the physical transmission specification and medium access control scheme while other standards such as the logic link control keep unchanged. After couples of years' study, appropriate medium access control (MAC) for wireless LANs still remains open to the research community.

The requirements for the MAC protocol of wireless LANs are rather severe in the IEEE 802.11. Some of the important considerations are listed as follows for reference.

Throughput: Since the spectrum is a scare resource, the MAC protocol should utilize the spectrum very efficiently and achieve a high throughput.

Multiple PHYs (physical layer transmissions): There should be only one MAC to serve multiple physical layer transmission methods which may be the direct-sequence spread spectrum (SS-DS), (slow) frequency-hopped spread spectrum (SS-SFH), diffused infrared, or narrow-band digital signal transmission, though they might have quite different transmission characteristics.

Seamless Service: In the multiple-cell network environments which are different from the wireless voice networks, the data packets (or frames) must be received correctly and can not be dropped even during a handoff.

Multi-cast: According to the study of traffic in the wireless LANs, it is discovered that the down-link, i.e. from the network to the mobile nodes, traffic dominates the whole traffic in the networks. If the wireless LANs with infrastructure are taken into consideration, such a down-link traffic is likely achieved through the base stations or repeaters which broadcast the data packets to the mobile nodes. The MAC protocol must support the multi-cast function.

Synchronous Services: The MAC should have reasonable delay statistics to support the synchronous (time-bounded) services other than the data file transmission.

Fairness: All users or mobile nodes should have equal opportunity to access the wireless LAN. The mobile nodes should be able to fairly register in the wireless LAN if they are qualified.

Power Consumption: Since the mobile nodes are likely to be operated by a battery power, any MAC protocol to keep the mobile nodes listening to the base station(s) all the time should be avoided in the practical applications.

Simple to Implement: In practical applications of the LAN environments, not only the mobile nodes but also the base stations should be able to be simply implemented. Traditional MAC (or multiple access) protocols for the wireless cellular-type networks use complicated hand-shaking procedures to complete a handoff. Within a cell which is known as the coverage of a base station, many protocols based on the token passing, carrier sensing, ALOHA have been proposed. They are, however, all facing some difficulties to be a perfect solution for the wireless LANs. At the same time, a more general MAC protocol should take both of the multiple access and handoff into consideration. Efforts have been made to develop a reasonable protocol in these years, but there is still no solution which can meet all of the MAC requirements for the wireless LANs now. The CDMA (Code Division Multiple Access) or B-CDMA (Broad-band CDMA) is hard to achieve the high-rate overlay data transmission in practical application due to the limitation of available spectrum and desirably simple base stations for the LAN applications. Therefore, how to develop a reasonable and appropriate MAC protocol for the wireless LANs is still a very important issue in this field.

SUMMARY OF THE INVENTION

The primary object of the present invention is to provide a medium access control protocol, named as a randomly addressed polling (RAP) method in this specification, for all kinds of wireless networks. The RAP method can provide many attractive features, including distributed handoff, completely soft handoff, high throughput which implies an excellent channel utilization, simple realization complexity, and good for the narrow-band and wide-band radios and infrared transmissions.

The other object of the present invention is to provide a group RAP method wherein the users or mobile nodes are divided into several groups, according to their previous random numbers in successful transmissions, for respective polling. In case that a great number of users or mobile nodes join the polling contention of a base station, the group RAP method can greatly improve the RAP's stability because the number of the users in a single group is greatly reduced relative to the number of all joining users.

In accordance with one feature of the present invention, a randomly addressed polling method for a network having a plurality of users and base stations, each base station being capable of conducting an up-link communication and a down-link communication under its coverages with the users, and each user being capable of becoming actinic when it has a packet to transmit, the randomly addressed polling method comprises the following steps of:

(a) when a respective base station is ready to conduct the up-link communication, the base station broadcasting a ready message to all users under its coverage;

(b) each user generating at least one random number whenever becoming active;

(c) all active users under the coverage of the base station simultaneously transmitting their random numbers to the base station in response to the ready message;

(d) the base station collecting the random numbers, and polling the active users according to the collected random numbers;

(e) when the base station successfully receives the packet of a respective active user, the base station sending a positive acknowledgment to the active user; and (f) when the base station unsuccessfully receives the packet of a respective active user, the base station sending a negative acknowledgment to the active user.

In accordance with another feature of the present invention, the step (b) includes the step of each active user generating two random numbers respectively at two stages. The step (d) includes the steps of the base station respectively collecting the two-stage random numbers, deciding which one of the stages has the most number of distinctly collected random numbers, and polling the active users according to the random numbers at the one decided stage.

In accordance with further feature of the present invention, each base station includes a super-frame structure consisting of a plurality of first frames and a second frame, and each of the first and second frames polls the active users individually. Furthermore, those of the active users which had successfully sent the packets to the base station are grouped respectively into the first frames according to their previous random numbers for respective polling, and the other active users which have not successfully sent the packets to the base station are grouped into the second frame for polling.

In accordance with yet another feature of the present invention, the users are mobile among the coverages of the base stations. Each base station has a representing address, and the step (a) further includes the step of the base station broadcasting its representing address to all users under its coverage. Each user or mobile node is assigned a PBS location in the network to store the representing address of one of the base stations currently covering the user. When the user learns that it is under the coverage of another base station, the user sends the representing address of the another base station to its PBS location for changing.

In accordance with yet further feature of the present invention, the randomly addressed polling method further comprises the following steps of:

(g) when there is a packet intending to be sent to one of the users in the down-link communication of the network, retrieving the representing address stored in the PBS location of the one user;

(h) sending the packet to one of the base stations corresponding to the retrieved representing address; and (i) the one base station broadcasting and sending the packet to the one user.

In accordance with yet another feature of the present invention, the adjacent coverages of the base stations are appropriately overlapped. When the active mobile user moves to the overlapped coverage, the active user monitors the signal strengths from the relative base stations, and selects the base station with the strongest signal strength to follow.

BRIEF DESCRIPTION OF THE DRAWINGS

The present invention can be more fully understood by reference to the following description and accompanying drawings, which form an integral part of this application:

FIG. 12b is a schematic diagram illustrating a single frame structure of the super-frame structure shown in FIG. 12a.

DETAILED DESCRIPTION OF THE PREFERRED EMBODIMENTS

Figure 1:
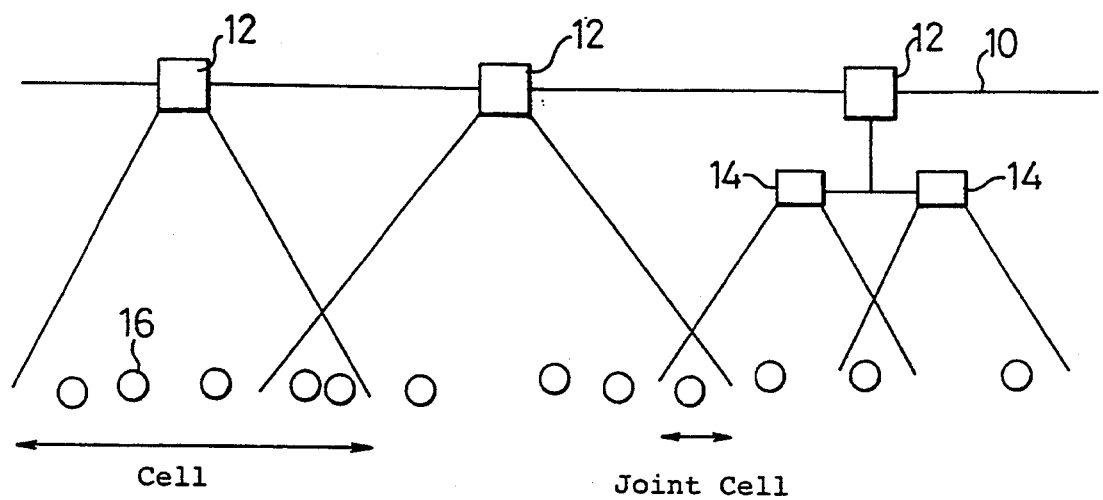
FIG. 1 is a schematic block diagram of a typical wireless local area network with infrastructure.

Referring now to FIG. 1, there is shown a typical wireless network, or wireless LAN, with infrastructure. The wireless LAN includes a wired high-speed backbone 10, and a plurality of base stations 12 connected to the backbone 10. Under the base station 12, several repeaters 14 may be connected thereto. The coverage of a base station 12 is known as a cell in this specification. To provide seamless data services, the adjacent cells should be adequately overlapped, and the overlapped area is known as s joint cell in this specification. Under the coverages of the base stations 12, a plurality of mobile nodes or users 16 may exist. Hereinafter, the applicant will utilize the wireless LAN to describe a randomly addressed polling (RAP) method according to one preferred embodiment of the present invention. However, it should be understood that the RAP method can be easily generalized to all kinds of networks and personal communication services through wired and/or wireless medium. For example, the present invention can also be applied to the wireless networks with multiple-cell coverage (including microcell and picocell structures), personal communication networks or personal communication services through wireless medium, as well as data networks and integrated service networks through wired and/or wireless medium.

Since the MAC of wireless LAN has to serve the mobile nodes 16 which perhaps move across the cell boundaries, the handoff initiated by a centralized scheme will make the system implementation very complicated. Also, the dynamic nature of the wireless transmission and network makes the decentralized protocol hard to work reliably. Therefore, the present invention proposes a centralized MAC protocol with partial decentralized functions, such as the initiation of a handoff. Such a MAC protocol is named as a randomly addressed polling (RAP) method. Since the down-link, i.e. from the base station 12 or repeater 14 to the mobile nodes 16, transmission is obviously achieved by broadcasting, the RAP method is primary aiming at the up-link traffic, i.e. from the mobile nodes 16 to the base station 12 or repeater 14. The whole RAP method of the present invention will be described in detail later.

The fundamental idea of the RAP method is that the base stations 12 only poll those active mobile nodes 16, i.e. the mobile nodes with packets ready to transmit, under their own coverages. Only the active mobile nodes 16 will be polled since there is no guarantee that polling all mobile nodes in the coverage of a base station can work (this could refer to the inventor's article "*On the Design of Medium Access Control Protocol for High Speed Wireless LANs*"). Actually, the, reason is simple. Due to the dynamic wireless channel characteristics and network topology, the IEEE 802.11 requires that previous transmission does not imply successful transmission next time even without error caused by noise. The collection of the mobile nodes under the coverage of any specific base station is not completely known by the base station. The RAP protocol only intends to identify those active mobile nodes and polls those nodes. The RAP method can be carried out by the following procedure.

1. When a base station 12 is ready to collect up-link packets, it broadcasts a ready message, for example [READY], to all mobile nodes 16 under its coverage. Alternatively, the ready message may be only a special end-of-file message from the previous (broadcasting) transmission. It should be noted that the base station 12 may not know its coverage and thus covered mobile nodes 16. This is a realistic situation for the wireless LANe due to the fast changing environments.

2a. For each active mobile node 16 intending to transmit the packet, it generates a random number, for example, from the set $I_R=\{0, 1, \ldots, p-1\}$. It should be noted that this random number may be generated in advance before the reception of the ready message.

2b. All these active mobile nodes 16 simultaneously transmit their own random numbers which are good only for one polling cycle. All random numbers must be simultaneously transmitted orthogonally, for example, by the orthogonal codes such as those for the synchronous/asynchronous code division multiple access (CDMA), or by different frequency information. Furthermore, each active mobile node 16 may generate several, for example L, random numbers, and transmit at L stages respectively.

2c. In general, the mobile nodes 16 may transmit the random numbers q times at each stage. The base station 12 may use a majority-vote policy to decide the correctly transmitted random number(s). With error-free transmission assumed this specification, $q=1$ is enough. In case that the base station 12 can not recognize certain random number(s), it will assume no reception.

3. The base station 12 listens to all random numbers or addresses at each stage simultaneously. Suppose there are N active mobile nodes 16. At the lth ($1 \leq l \leq L$) stage, there are N random numbers represented by certain way which the base station 12 can recognize. Let these N random numbers be $r_l^1, \ldots, r_l^N$ which is perhaps not distinct at the lth stage. If there is no random number from the mobile nodes 16, this polling cycle is stopped.

4. If at the l*th stage, there exists the most number of distinct random numbers which are $R_1 < \ldots < R_{N^*}$. Then, the base station 12 broadcasts that it will poll according to the l*th random numbers of the mobile nodes 16. When the base station 12 polls the mobile nodes which had sent the random number $R_r$ ($1 \leq r \leq N^*$) at the l*th stage, the mobile node(s) transmits the packet(s) to the base station 12. Collision will occur when two or more mobile nodes send the same random number. If $N=N^*$, no collision exists.

5. When the base station 12 successfully/unsuccessfully receives the packet from the mobile node 16, it sends a positive/negative acknowledgment, for example [PACK]/[NACK], right away before polling next one or at the end of polling all current active nodes. If the mobile node receives [PACK], it removes the packet from its buffer. Otherwise, the mobile node(s) keep the packet(s) for further polling. After all scheduled transmissions are completed, the base station 12 re-polls again, i.e. repeats the above steps 1–4. Although the re-polling polling may allow new active mobile nodes to join, we assume that no new active mobile node is allowed to join re-polling.

One example is described here to facilitate the understanding of the RAP method. Suppose there are eight mobile nodes A, B, C, D, E, F, G, and H under the coverage of a base station. We choose $p=5$ and thus form a Galois Field $GF(5)=\{0, 1, 2, 3, 4\}$. At the beginning of the polling cycle, only five mobile nodes A, D, E, G, and H are the active nodes with packets to transmit. Let $L=2$. When the ready message [READY] is received, all active mobile nodes A, D, E, G, and H generate and transmit, for example, the following random numbers at two stages (step 2).

A: 3 ; 0
D: 2 ; 3
E: 2 ; 1
G: 1 ; 4
H: 1 ; 1

For the base station, it collects three random numbers 1, 2, and 3 at the first stage and four random numbers 0, 1, 3, and 4 at the second stage if the transmission of distinct numbers can be done orthogonally (step 3).

The base station collects the most distinct numbers (or addresses), i.e. four, at the second stage. Thus, the base station broadcasts that it will poll the mobile nodes according to the second random numbers in order of 0, 1, 3, and 4. When the base station polls "0", the mobile node A sends its packet. With error-free transmission, the node A will get a positive acknowledgment [PACK] from the base station. So will the nodes D and G. However, when the base station polls "1", the packets from the nodes E and H collide. Not considering the capture effect, the nodes E and H will receive a negative acknowledgment [NACK], and go to re-polling procedure (steps 4 and 5). Of course, with the consideration of channel errors, the nodes A, D, and G may get the negative acknowledgment [NACK] either, and join the re-polling.

Repeating the step 2 of the RAP method, the nodes E and H generate and transmit, for example, the following random numbers.

E: 4 ; 2

H: 3 ; 2

In this situation, the collision can be resolved at the first stage. It can be shown that the expected time to resolve the collision in the RAP protocol of the present invention is finite.

Figure 2:
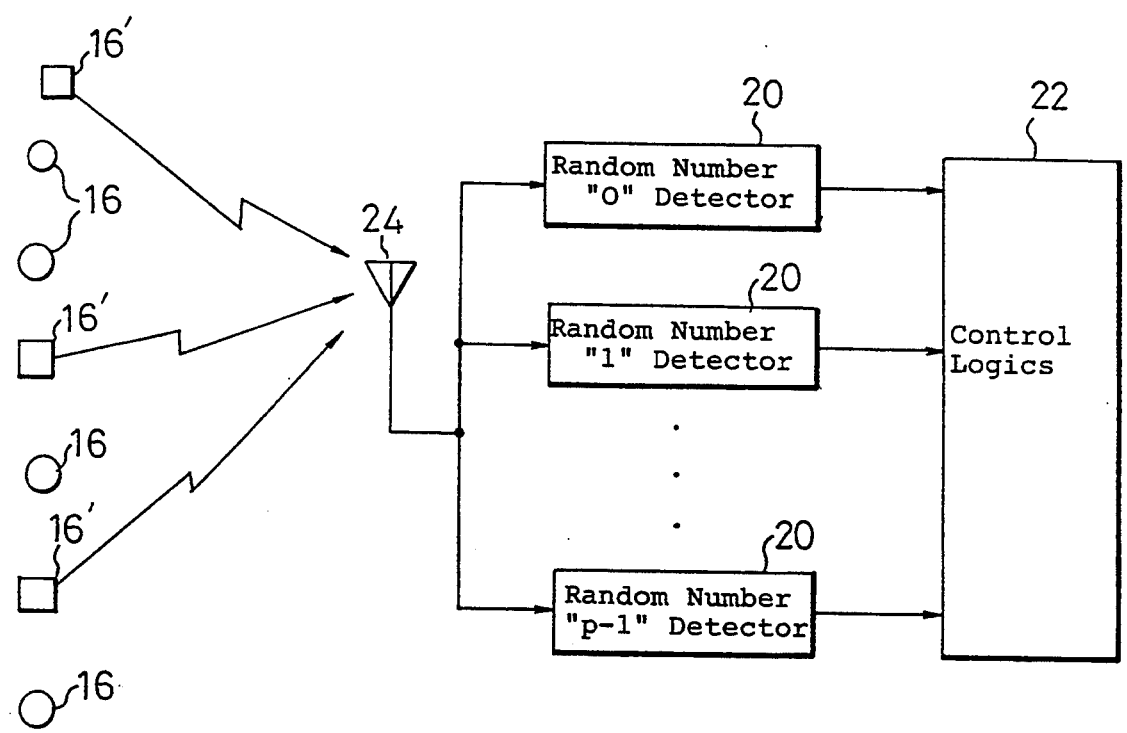
FIG. 2 is a schematic block diagram of a random number detection mechanism in a base station in accordance with the present invention.
Figure 3:
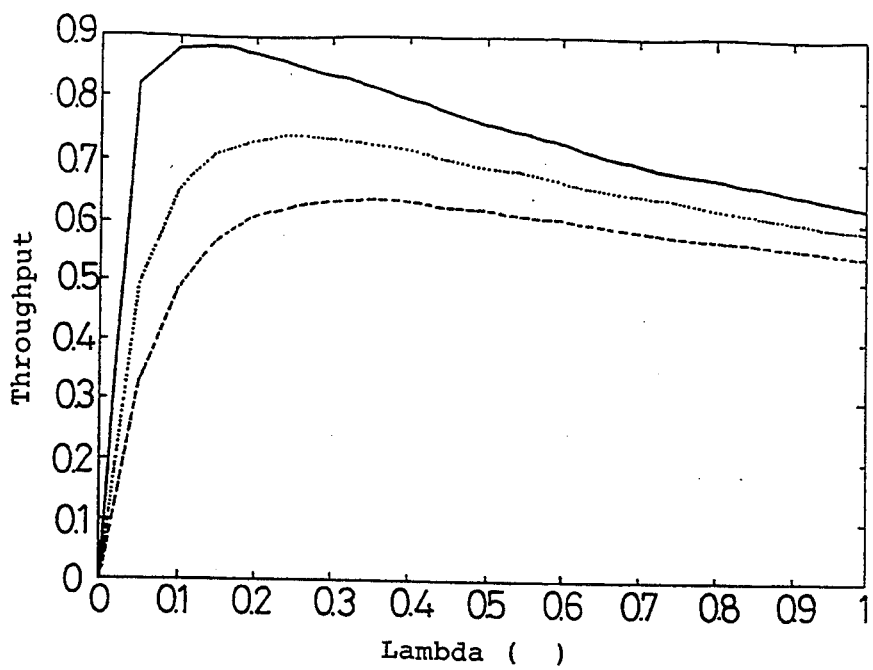
FIGS. 3 to 10 are curve charts obtained from the computer simulations for a RAP method of the present invention with ten mobile nodes in a cell, showing the throughputs of the RAP method in different parameters.
Figure 4:
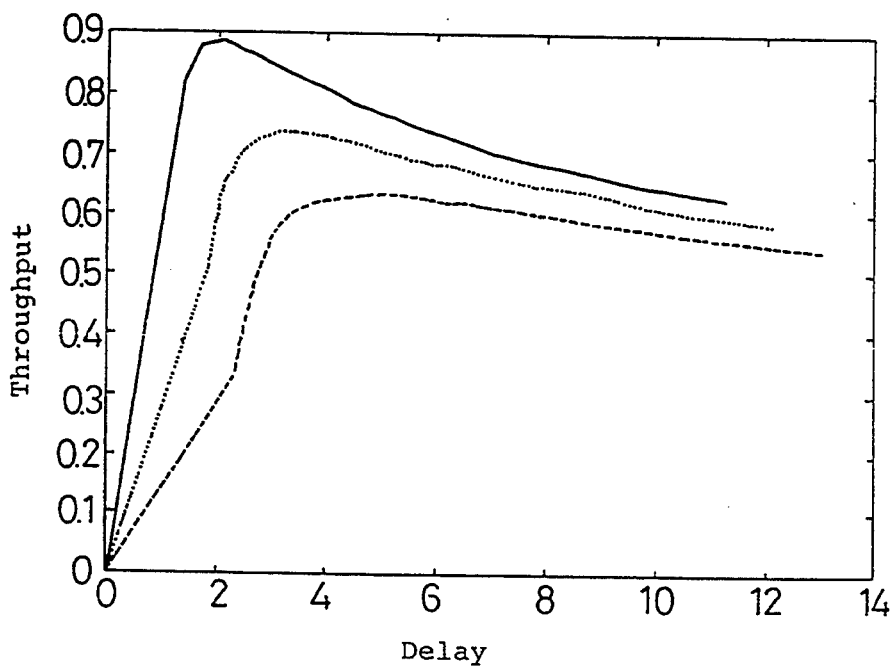
Figure 5:
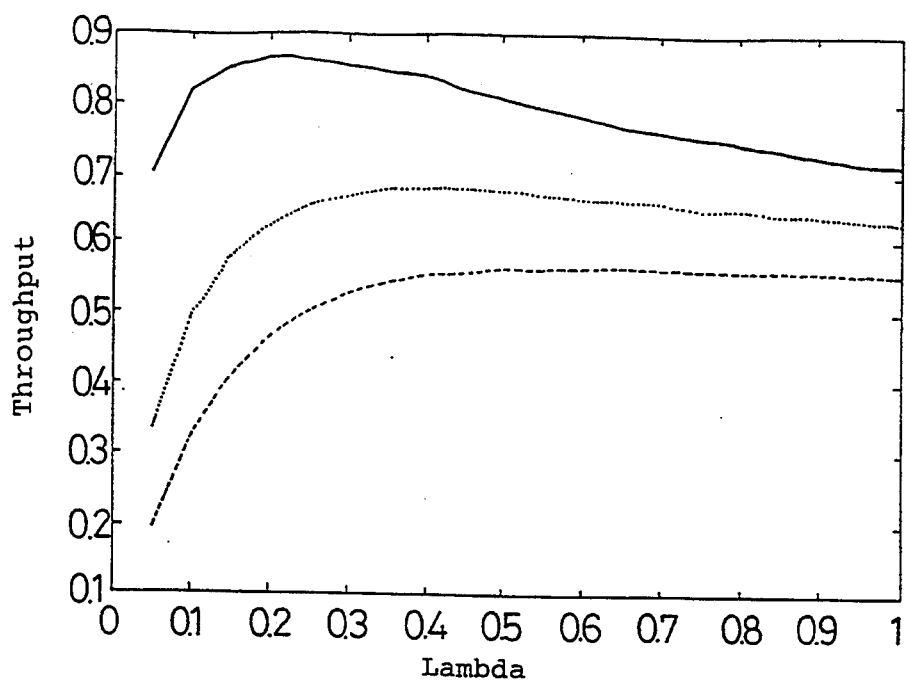
Figure 6:
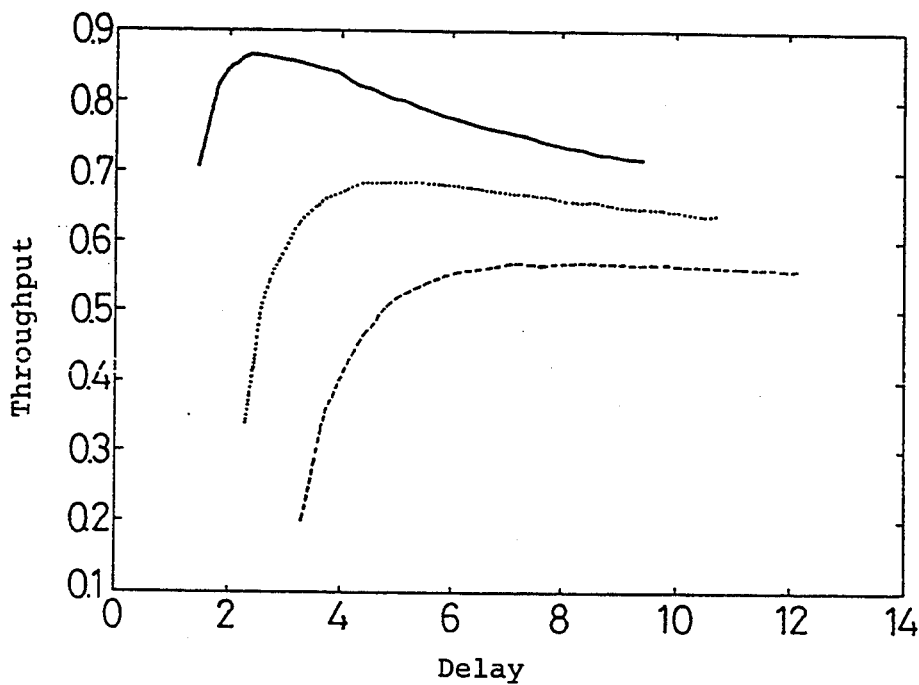
Figure 7:
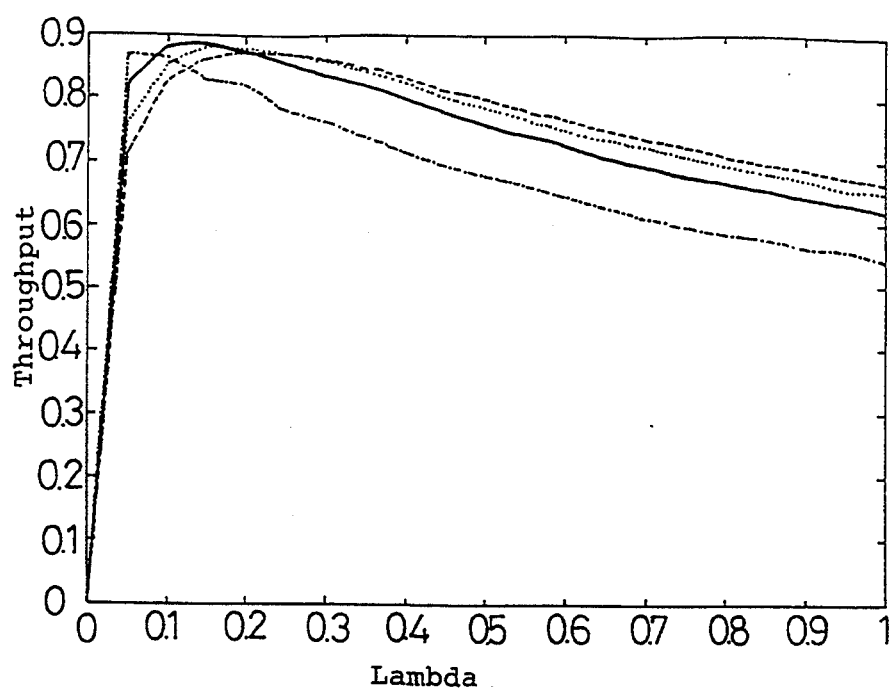
Figure 8:
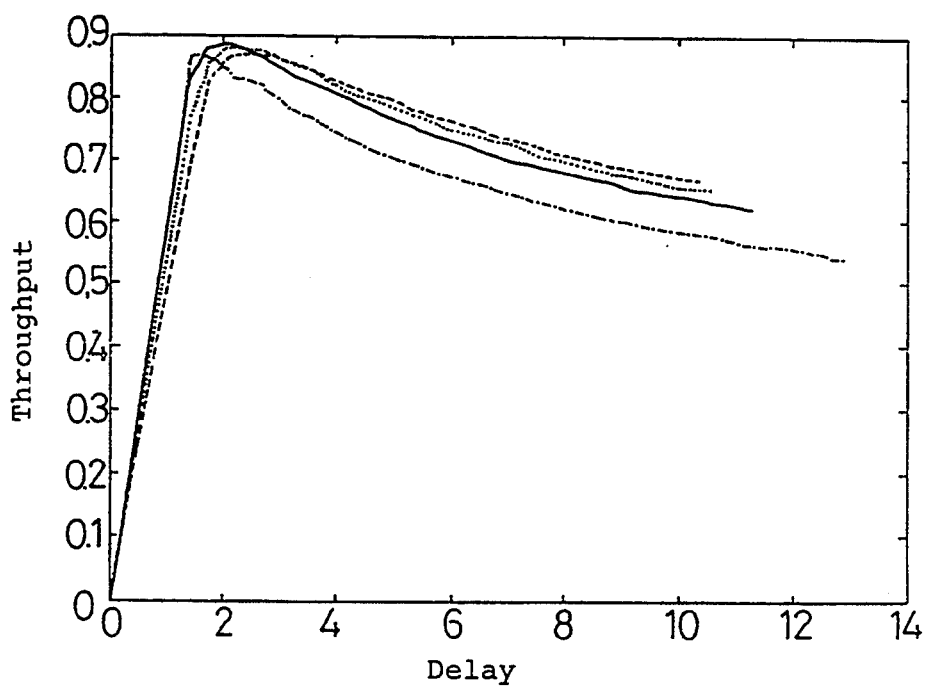
Figure 9:
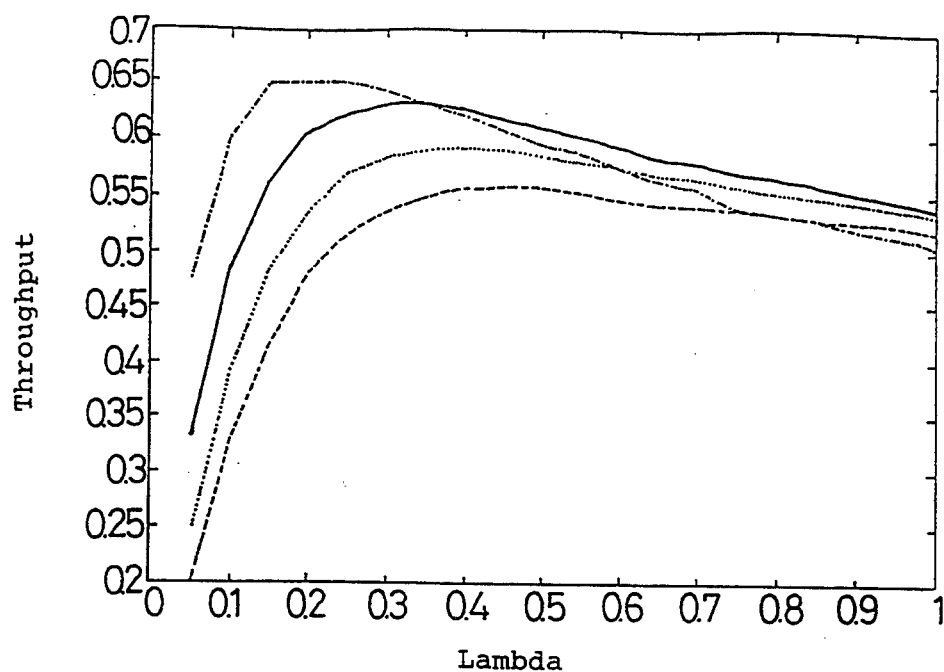
Figure 10:
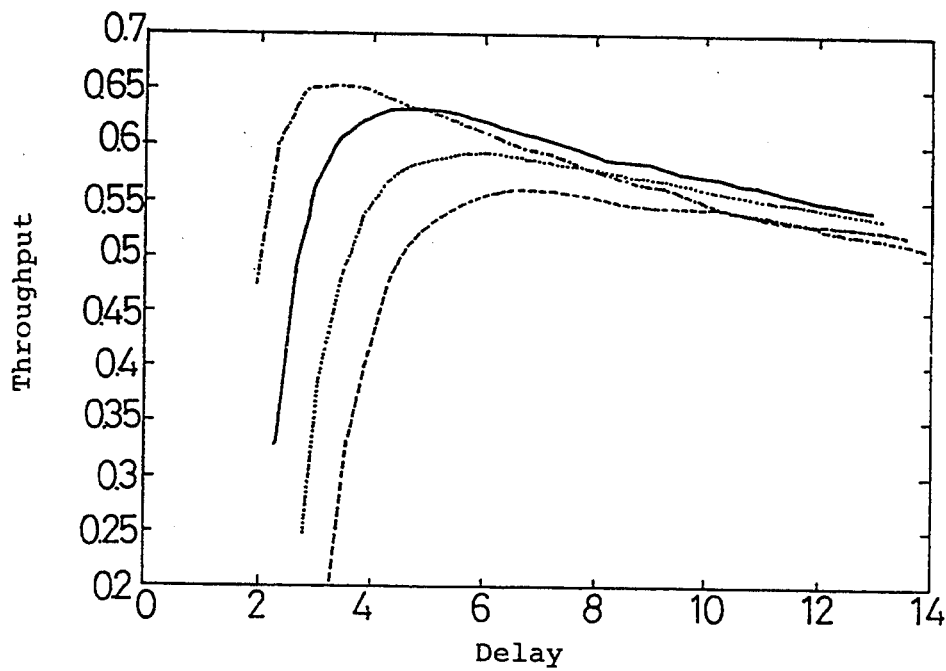

The success of this protocol relies heavily on whether the active mobile nodes 16 can apply an appropriate orthogonal signaling to transmit the random numbers (addresses) to the base station 12. Since the present invention intends to apply this MAC protocol for different transmission methods such as the direct sequence spread spectrum, frequency hopped spread spectrum, narrow-band RF, and infrared with direct detect modulation, and so on, it is necessary to propose a practical signaling and detection mechanism for different transmissions. A practical random number (address) detection mechanism is shown in FIG. 2. As shown in FIG. 2, there are shown four non-active mobile nodes 16 represented by a circle symbol, and three active mobile nodes 16' represented by a square symbol under the coverage of a base station. The detection mechanism of the base station includes p random number detectors 20 connected in parallel. The random number detectors 20 are connected between ark antenna 24 and control logics 22. The next problem is to find the proper signaling. The signaling scheme requires:

It is easy to detect even when the signal-to-noise ratio is not high.

It can fit at least the infrared, SS-DS, SS-SFH, and narrow-band RF.

The detection time can not be long in comparison with the packet length in order to maintain the efficiency of the channel utilization.

There exists appropriate detection scheme(s) with reasonably implementation complexity.

It is well known that many CDMA sequences have the desirable characteristics possibly to transmit the random numbers in the RAP protocol. However, they are generally suffering from the following problems.

They are coherent sequences and not proper for the infrared and SS-SFH.

To make the detection reliable, the sequence length can not be shortened, and thus the detection is complicated and time-consuming.

One kind of the noncoherent sequences, i.e. prime sequences, can be used in the present invention to meet the requirements. One example of the prime sequences will be described hereinafter for reference. The construction of the prime sequences is briefly summarized as follows. Let p be a prime number and $GF(p) = \{0, 1, \ldots, p-1\}$ be a Galois Field. A prime sequence $S_x$ is constructed by multiplying every element j from $GF(p)$ with an element x then module p.

$$S_x = (S_{x0}, S_{x1}, \ldots, S_{xj}, \ldots, S_{x(P-1)})$$

The binary prime sequence $C_x$ is obtained by the rule:

$$C_x = (C_{x0}, C_{x1}, \ldots, C_{xj}, \ldots, C_{x(P^2-1)})$$

where $$C_{xk} = \begin{cases} 1, & i = S_{xj} + jp; j = 0, 1, \ldots, p-1 \\ 0, & \text{otherwise} \end{cases}$$

There are totally p distinct primary prime sequences with the length of $p^2$ bits generated by this rule. As an example, the primary prime sequences for p=5 are listed as follows:

$C_0 = (10000, 10000, 10000, 10000, 10000)$ $C_1 = (10000, 01000, 00100, 00010, 00001)$ $C_2 = (10000, 00100, 00001, 01000, 00010)$ $C_3 = (10000, 00010, 01000, 00001, 00100)$ $C_4 = (10000, 00001, 00010, 00100, 01000)$

Obviously, we can use the above sequences to represent the random numbers (addresses) in the RAP method of the present invention, and to provide the orthogonality due to their feasibility to be the noncoherent signature sequences in the CDMA systems. The advantage of the noncoherent sequences is that a noncoherent detection can be used to decide the transmitted random numbers for all kinds of transmissions. The present invention can use the following signaling system: transmission in a time slot as "1", and no transmission in a time slot as "0". Such a signaling system is good for the infrared, SS-DS with low processing gains which are common for the wireless data communication networks, SS-SFH, and narrow-band RF.

Another mere practical and advantageous approach is to directly use the following sequences.

| | |
|---|---|
| 1: | 1010101010101010101 . . . |
| 2: | 1001001001001001001 . . . |
| 3: | 1000100010001000100 . . . |
| 4: | 1000010000100001000 . . . |
| 0: | 1000001000001000001 . . . |
| | or 111111111111 . . . (for biphse signals) |

The RAP protocol of the present invention can be evaluated on the basis of the Poisson traffic assumption. Within a unit time, i.e. the packet transmission time in this specification, a mobile node has packets to transmit followed by a Poisson distribution with intensity λ. We define the throughput $\eta$ to be:

$$\eta = \frac{\sigma_{succ}}{\sigma_{succ} + \sigma_{coll} + \sigma_{overhead} + \sigma_{idle}}$$

where $\sigma_{succ}$ is the time duration for successful transmission; $\sigma_{coll}$ is the time duration for collisions; $\sigma_{overhead}$ is the time duration for polling and detection overhead; $\sigma_{idle}$ is the time duration of no packet transmitted to the network. We also define the time delay D to be the time duration from a mobile node becoming active to its packet being successfully transmitted, and the overhead to be the total time resulting from the transmission and detection of the random numbers, polling overhead, propagation delay, etc. in the unit of packet transmmission time. FIGS. 3 to 10 demonstrate the computer simulations of the RAP protocol with ten mobile nodes in a cell, i.e. the coverage of a base station. These Figures show that:

The practical throughput of the RAP protocol for the wireless networks can be higher than 0.88 when the overhead is 0.1 packet length. Even we loose the overhead constraint, the RAP protocol still demonstrates a satisfactory throughput and delay performance as a MAC for the wireless networks.

With more possible random numbers, although the maximum throughput is lower due to the increase of the overhead length, the RAP method performs better in the heavy traffic situations (FIGS. 3 to 8).

Using more stages can not improve the performance due to the increase of the overhead. L=1, 2 are better cases for the RAP protocol.

There are two extra situations which have to be considered in order to make this protocol complete, and they are the joint-cell operation and down-link operation.

Figure 11A:
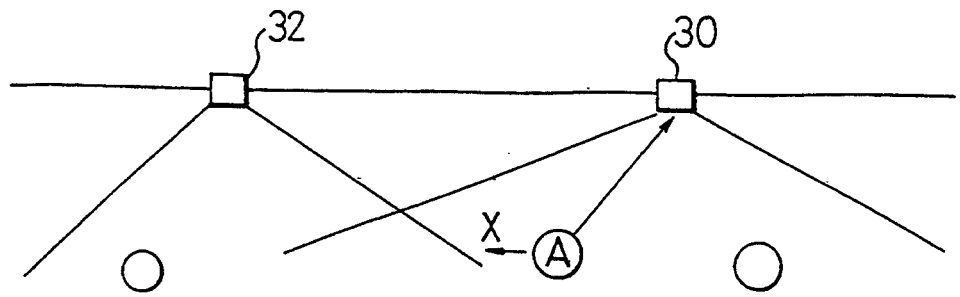
FIGS. 11a–11c are schematic diagrams illustrating that an active mobile node moves from the coverage of a base station to the coverage of another base station through the joint cell between the two base stations, and transmits the up-link packets without a handoff, according to the RAP method of the present invention.
Figure 11B:
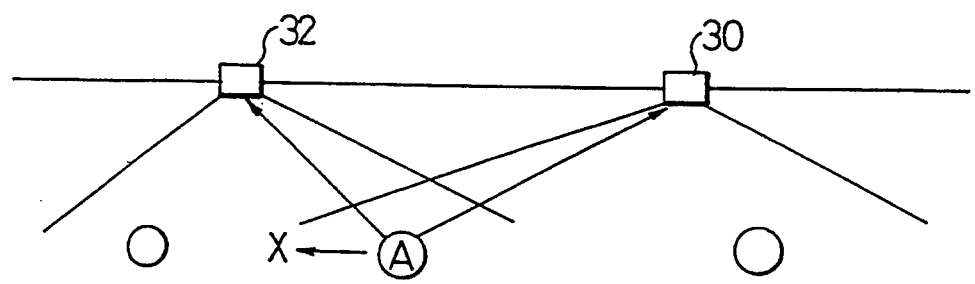
Figure 11C:
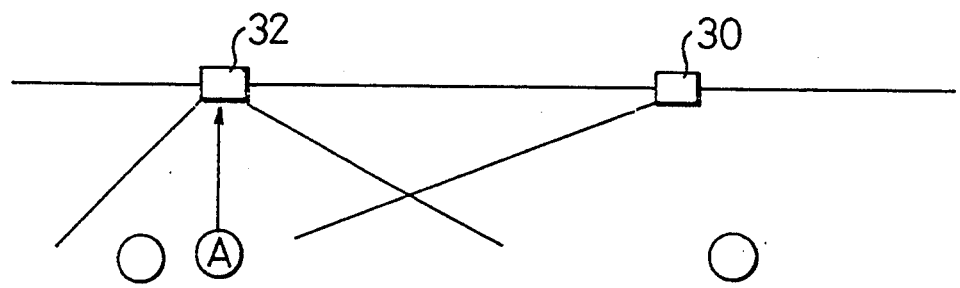

As shown in FIG. 1, the mobile nodes 16 are possibly in the joint cell region, that is, under the coverages of two or more base stations 12. This situation actually demonstrates the advantage of the RAP protocol of the present invention. When the mobile node 16 becomes active, it only has to listen to the ready message broadcasting [READY]s from the base stations 12. The mobile node 16 can pick up the clearest base station and follow its instructions to be polled. The handoff becomes transparent in this situation for the RAP protocol. In case that a mobile node moves across the joint cell or cell boundary, the RAP protocol allows this mobile node to transmit its up-link packets without handoff, and this is a novel improvement on the MAC protocol for the cellular-type wireless networks. FIGS. 11a to 11c illustrate the no up-link handoff of the RAP method. In FIG. 11a, an active mobile node A is only under the coverage of a base station 30, and is moving along the direction shown by an arrow X. In this situation, the mobile node A sends the packet to the base station 30. In FIG. 11b, the mobile node A has moved to the joint cell between the base stations 30 and 32. In this situation, the moving mobile node A can join the polling of the base station 30 or 32 according to its own choice, for example according to the signal strengths from the base stations 30 and 32. In FIG. 11c, the mobile node A is only under the coverage of the base station 32, and thus sends the packet to the base station 32.

Up to this point, the present invention only considers the RAP protocol in the up-link situations except the broadcasting for the down-link. However, under the multiple-cell operation, the down-link transmissions can not be fully successful via simple broadcasting because the mobile nodes may move to other cells or stay in the joint cell. The present invention has to further modify the RAP protocol for the down-link, i.e. from the base station 12 to the mobile nodes 16 as shown in FIG. 1, as follows:

1. When any mobile node registers in the wireless network, a PBS (Permanent Base Station) location in the network is assigned to store the representing address of a CBS (Current Base Station) now covering this specific mobile node. This PBS may be the central switch for the cellular networks.

2a. When a base station polls the mobile nodes, it can identify itself by use of the representing address at the same time. If a mobile node learns that it is under the coverage of a new base station, it sends a message regarding the address of its new CBS to the PBS location for changing. For a wireless LAN, the mobile nodes are possible to learn the change of the coverage only when it becomes active. Thus, the mobile nodes do not have to monitor the base stations all the time and thus this manner can save power. However, if the mobile nodes require certain time-bounded services from the wireless networks such as voice in a cellular telephone network, the following step 2b is suggested to conduct a soft handoff.

2b. Under the time-bounded services, the mobile nodes in the joint cells have to monitor the signal strengths from the possible base stations. A two-level handoff is suggested here. Let $\delta_n$ be the signal strength of a potentially new CBS for a mobile node in the joint cell, and $\delta_c$ be the signal strength of the CBS. It is defined that $\delta = \delta_n - \delta_c$. If $\delta > \alpha_-$, the mobile node is ready to handoff. When $\delta > \alpha_+$, the mobile node makes a soft handoff.

3. Any packet intending to a mobile node goes to the PBS of the mobile node first. After finding the address of the CBS, the packet goes to the CBS, and is broadcasted. If the CBS can not get the positive acknowledgment [PACK] from the destinated mobile node after some trials, this packet will be returned to the PBS of the mobile node.

To support, the multi-cast function of the RAP protocol, such kind of packets will be broadcasted multiple times to ensure the successful reception, under channel error(s), of the positive acknowledgments [PACK]s from all destinated nodes. It should be understood that adequate control of the polling timing at the base stations, such as (colored) token passing, can make the RAP method work smoother.

Figure 12A:
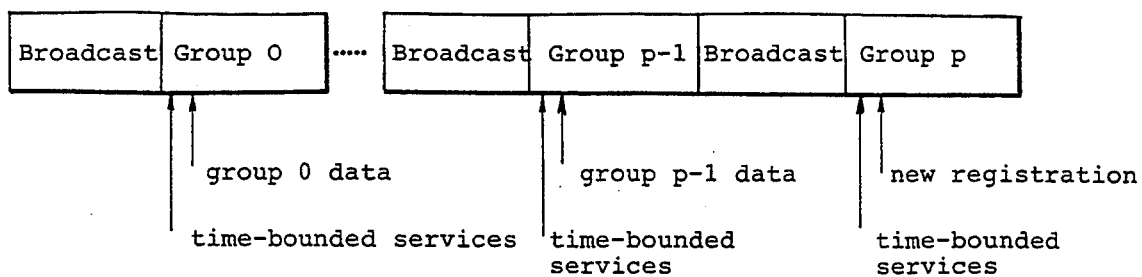
FIG. 12a is a schematic diagram illustrating the super-frame structure of a group RAP method according to another preferred embodiment of the present invention.
Figure 12B:
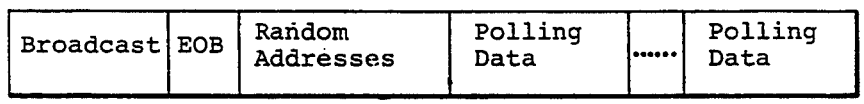

From the theoretical analysis of the RAP protocol, we can observe the advantage of high-efficient polling when there exist very few active mobile nodes in one random address (or number) contention cycle, i.e. the number of the active mobile nodes is significantly less than p. Furthermore, since the down-link message load is much heavier than the up-link message load, an efficient MAC protocol for the wireless LANs should allocate an enough transmission period for the down-link transmission (broadcasting). Therefore, the present invention further proposes a group RAP (GRAP) method as shown in FIGS. 12a and 12b to improve the stability of the RAP based on a super-frame structure. FIG. 12a shows the super-frame structure of the GRAP method according to another preferred embodiment of the present invention, and FIG. 12b shows a single frame structure of the super-frame structure as shown in FIG. 12.

Referring to FIGS. 12a and 12b, the GRAP adopts a super-frame structure consisting of p+1 frames (from Group 0 to Group p). In each frame, the first part is dedicated to the base station's broadcasting. It should be noted that each broadcasting must consist of multiple identical transmissions to ensure the precise reception for multi-casting. After the base station ensures the correct reception of broadcasting, the end-of-broadcasting [EOB] is broadcast, and the active mobile nodes under its coverage know that the polling cycle begins and proceeds as previous descriptions. However, in the GRAP protocol, not all active mobile nodes contend in one polling contention period. Those old nodes which had sent transmission(s) successfully to this base station before this cycle are arranged into the Group 0 to Group p−1 respectively according to their previous successful random numbers (or addresses). All new joining nodes are arranged into the pth group. Only the mobile nodes in the same group contend with each other individually. In this way, the number of the active mobile nodes joining one polling contention will be significantly reduced, so that the RAP's stability can be highly improved, even in the situation that a great number of active mobile nodes exist under the coverage of a base station.

The GRAP has an advantage to support both of the "priority traffic" and "no-priority traffic". In order to support the "priority traffic", such as those in the integrated services or multi-media, the protocol of the present invention can limit the mobile nodes with lower traffic priority to only generate part of the random numbers, for example in the set $I_R = \{0, 1, \ldots, p-1\}$. Furthermore, since the random numbers are actually generated by the mobile nodes themselves, the fairness of access in the present invention is for sure. Additionally, in case that the receptions of two active nodes at a base station differ quite a lot, and even worse that the stronger one keeps transmission for a series of packets, the GRAP can also resolve this situation because there is a large probability that the node with stronger transmission will change to another group according to its newest successful random number quickly. Thus, the fairness of access is further guaranteed.

In case that the time-bounded services (such as voice) are supported, those active mobile nodes with time-bounded service packets can join any group for contention. To avoid possible congestion, i.e. too many packets in a superframe, the time-bounded service packets may be dropped after certain delay if such an action is tolerable, or may be scheduled to next (or next a few) groups. We can also observe that the down-link traffic has quite a lot more periods to broadcast.

Two examples are described here to illustrate how the GRAP method works. In the first example, suppose ten active mobile nodes A, B, C, D, E, F, G, I, K, and L are under the coverage of a base station, and p=5. The nodes A, C, D, F, G, I, and L had sent successful transmissions at this base station, and their previous random numbers are 2, 3, 0, 2, 1, 4, and 3 respectively. The nodes B, E, and K do not send a successful transmission at this base station before. After the broadcasting period, the node D is in the group "0", the node G is in the group "1", the nodes A and F are in the group "2" for contention, the nodes C and L are in the group "3" for contention, the node I is in the group "4", and the nodes B, E, and K are in the group "5" for contention.

In the second example, suppose ten mobile nodes A, B, C, D, E, F, G, I, K, and L are under the coverage of a base station, and p=5. At the beginning of a superframe, the nodes A, C, E, and K have the data packets to transmit, and their previous random numbers are 2, 3, 0, and 2, respectively. The node F has a timebounded packet to transmit. After the broadcasting period, the nodes E and F are in the group "0" for contention and polling. No node is active for group "1". Then, the node L has a time-bounded service packet to transmit and an active mobile node X becomes under the coverage of the base station. The nodes A, K, and L are in the group "2" now. The node L's time-bounded service packet may not go through after the first trial (or first a few trials). The node L may defer to the next group in order to let other packets easier to go through. Then, the nodes C and L are in the group "3". Finally, the node X is in the group "5".

Another version of the GRAP protocol which is suitable for the heavy time-bounded service traffic is to change its grouping policy. Both data packets and time-bounded service packets are arranged according to their previous random numbers in successful transmissions. However, if data packet(s) facing certain delay in polling contention, its transmission is rescheduled to the next superframe or later group.

While the invention has been described in terms of what is presently considered to be the most practical and referred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A randomly addressed polling method for a network having a plurality of users and base stations, each base station being capable of conducting an up-link communication and a down-link communication under its coverages with said users, and each user being capable of becoming active when it has a packet to transmit, said randomly addressed polling method comprising the following steps of:

(a) when a respective base station is ready to conduct said up-link communication, said base station broadcasting a ready message to all users under its coverage;

(b) each user generating at least one random number whenever becoming active;

(c) all active users under the coverage of said base station simultaneously transmitting their random numbers to said base station in response to said ready message;

(d) said base station collecting said random numbers, and polling said active users according to said collected random numbers;

(e) when said base station successfully receives the packet of a respective active user, said base station sending a positive acknowledgment to said active user; and (f) when said base station unsuccessfully receives the packet of a respective active user, said base station sending a negative acknowledgment to said active user.

2. A randomly addressed polling method as claimed in claim 1, wherein the step (b) includes the step of each active user generating two random numbers respectively at two stages; and wherein the step (d) includes the steps of said base station respectively collecting said two-stage random numbers, deciding which one of said stages has the most. number of distinctly collected random numbers, and polling said active users according to said random numbers at said one decided stage.

3. A randomly addressed polling method as claimed in claim 2, wherein each base station includes a superframe structure consisting of a plurality of first frames and a second frame, and each of said first and second frames polls said active users individually; and wherein those of said active users which had successfully sent the packets to said base station are grouped respectively into said first frames according to their previous random numbers for respective polling, and the other active users which have not successfully sent the packets to said base station are grouped into said second frame for polling.

4. A randomly addressed polling method as claimed in claim 3, wherein each user is mobile among the coverages of said base stations.

5. A randomly addressed polling method as claimed in claim 4, wherein each base station has a representing address, and the step (a) further includes the step of said base station broadcasting its representing address to all users under its coverage; and wherein each user is assigned a PBS location in said network to store the representing address of one of said base stations currently covering said user, and when said user learns that it is under the coverage of another base station, said user sends the representing address of said another base station to its PBS location for changing.

6. A randomly addressed polling method as claimed in claim 5, further comprising the following steps of:
   (g) when there is a packet intending to be sent to one of said users in said down-link communication of said network, retrieving the representing address stored in the PBS location of said one user;
   (h) sending the packet to one of said base stations corresponding to said retrieved representing address; and
   (i) said one base station broadcasting and sending the packet to said one user.

7. A randomly addressed polling method as claimed in claim 6, wherein the adjacent coverages of said base stations are appropriately overlapped; and wherein when said active mobile user moves to the overlapped coverage, said active user monitors the signal strengths from the relative base stations, and selects the strongest signal strength to follow.

8. A randomly addressed polling method as claimed in claim 7, wherein said ready message is an end-of-file message of a previous transmission of said base station.

9. A randomly addressed polling method as claimed in claim 7, wherein said ready message is an end-of-broadcasting message of each frame of said super-frame structure.

10. A randomly addressed polling method as claimed in claim 7, wherein all of said random numbers are transmitted orthogonally.

11. A randomly addressed polling method as claimed in claim 10, wherein each random number is selected from a Galois Field.

12. A randomly addressed polling method as claimed in claim 10, wherein each random number is a noncoherent sequence.

13. A randomly addressed polling method as claimed in claim 12, wherein each random number is a binary prime sequence.

14. A randomly addressed polling method as claimed in claim 10, wherein the transmission of said random numbers may utilize a signaling system wherein transmission in a time slot is as "1" and no transmission in a time slot as "0".

15. A randomly addressed polling method as claimed in claim 7, wherein each random number is transmitted several times; and wherein said base station utilizes a majority-vote policy to decide the correctly transmitted random numbers.

16. A randomly addressed polling method as claimed in claim 7, wherein each base station includes a plurality of random number detectors to collect said random numbers.

17. A randomly addressed polling method as claimed in claim 7, wherein said network is a wireless local area network.

18. A randomly addressed polling method as claimed in claim 7, wherein said network is a wireless network with multiple-cell coverage.

19. A randomly addressed polling method as claimed in claim 7, wherein said network is a personal communication network through wireless medium.

20. A randomly addressed polling method as claimed in claim 7, wherein said network is an integrated service network through wired medium.

21. A randomly addressed polling method as claimed in claim 7, wherein said random numbers able to be generated by said users include some lower-priority random numbers, and wherein said users include some lower-priority users, and said lower-priority users are limited to be able to only generate said lower-priority random numbers.

22. A randomly addressed polling method as claimed in claim 6, wherein the step (i) includes the step of said one base station broadcasting the packet several times to support a multi-cast function of said randomly addressed polling method.

23. A randomly addressed polling method as claimed in claim 3, wherein the active user in one of said frames may be scheduled to a next frame after a predetermined delay in polling contention.

* * * * *